United States Patent [19]

Yamamoto et al.

[11] Patent Number: 4,767,199
[45] Date of Patent: Aug. 30, 1988

[54] PROJECTION LENS

[75] Inventors: Yoshiharu Yamamoto, Toyonaka; Yasuo Nakajima, Ibaraki; Shusuke Ono, Takatsuki, all of Japan

[73] Assignee: Matsushita Electric Industrial Co., Ltd., Osaka, Japan

[21] Appl. No.: 854,754

[22] Filed: Apr. 21, 1986

[30] Foreign Application Priority Data

Apr. 19, 1985 [JP] Japan .................................. 60-82600

[51] Int. Cl.$^4$ ........................... G02B 3/02; G02B 9/64; G02B 13/18

[52] U.S. Cl. .................... 350/412; 350/432; 350/463

[58] Field of Search ..................... 350/432, 412, 463

[56] References Cited

U.S. PATENT DOCUMENTS 4,300,817 11/1981 Betensky .............. 350/412
4,348,081 9/1981 Betensky .............. 350/412

FOREIGN PATENT DOCUMENTS 58-139111 8/1983 Japan .
59-170812 9/1984 Japan .

Primary Examiner—Bruce Y. Arnold
Assistant Examiner—Terry S. Callaghan
Attorney, Agent, or Firm—Wenderoth, Lind & Ponack

[57] ABSTRACT

A projection lens for projecting an image appearing on a cathode-ray tube onto a screen, small in residual aberrations, having a high imaging performance, also having a large aperture ratio and a wide field angle, suitable for a video projector having a high definition of, say, 1,125 scanning lines. The projection lens has, successively from the screen side, a Gauss type lens system, a positive lens mainly for enlarging the aperture ratio, and a negative lens mainly for widening the field angle, which negative lens has a strongly concave surface at the screen end.

4 Claims, 2 Drawing Sheets

PROJECTION LENS

BACKGROUND OF THE INVENTION

1. Field of the Invention

The present invention relates to a projection lens and more particularly to a projection lens for a high definition video projector which produces on a screen an enlargement of an image appearing on a high definition cathode-ray tube.

2. Description of the Prior Art

Conventional projection lenses are useful for a cathode-ray tube (CRT) on which an image is formed by 525 scanning lines, and most of them do not have a color correction function. There are known some projection lenses having an improved imaging capability attained by color correction. One projection lens constituted by plastic lenses alone is known as disclosed in Japanese Laid-Open Patent Application No. 59-170812 which is constituted by four lens units each composed of four lenses with aspherical surfaces. Further, a projection lens of a hybrid construction (constituted by plastic and glass lenses), is known which is constituted by four lens units each composed of five lenses, as disclosed in Japanese Laid-Open Patent Application No. 58-139111.

However, with these conventional projection lenses having a color correction function and constituted by plastic lenses, a good image quality cannot be ensured because of a large focus drift caused by a change in the ambient temperature. On the other hand, with the hybrid construction lenses which are less influenced by temperature variations, the aperture ratio is small, being in the range of 1:1.3 to 1:1.4, and so it is impossible to obtain a bright projected image. Further, in both constructions, because of large residual aberrations there has been a serious problem of deficiency of performance as a projection lens for use in a video projector of a high definition having 1,125 scanning lines. Besides, because of a small half field angle of about 20° to 23°, the projection distance, namely, the distance from a screen to the fore end of the projection lens, must be large in order to obtain a large picture plane. This requirement has been a problem in reducing the size of a projection television.

SUMMARY OF THE INVENTION

It is the object of the present invention to provide a projection lens for a high definition video projector capable of accurately correcting and reducing residual aberrations and which is a wide field angle projection lens having a large aperture ratio having a high performance and at the same time satisfying the characteristics of light weight, compact construction and low cost which are contrary to the characteristics for aberration correction.

In order to achieve the above object, the projection lens of the present invention comprises, in order from the screen end, a Gauss type lens system, a positive lens unit, and a negative lens unit. More specifically, the projection lens of the present invention comprises, successively from the screen end, a first lens unit which is a positive lens, a second lens unit which is a positive meniscus lens having a convex surface facing the screen end, a third lens unit which is a negative meniscus lens having a convex surface facing the screen end, a fourth lens unit which is a negative meniscus lens having a strongly concave surface facing the screen end and having a cemented surface, a fifth lens unit which is a positive lens unit, a sixth lens which is a positive lens mainly for attaining a large aperture ratio, and a seventh lens unit which is a negative lens mainly for attaining a wide field angle, having a strongly concave surface facing the screen end.

With this construction, residual abberations are corrected to a satisfactory extent and it becomes possible to obtain a performance as a projection lens satisfactory for a video projector of a high definition of 1,125 scanning lines. Moreover, there are attained a larger aperture ratio in the range from 1:1.1 to 1:1.15 and a wide field angle exceeding 26° in terms of a half field angle. Additionally, the positive lenses included in the first to fifth lens units can be made of glass having a refractive index not higher than 1.7 which is suitable for mass production, and thus, when coupled with plastic lenses of the sixth and seventh group lens units, it is possible to attain a reduction of weight and cost. In other words, according to the present invention it is possible to obtain a projection lens of light weight and low cost, having a performance satisfactory as a projection lens for a high definition video projector.

DESCRIPTION OF THE PREFERRED EMBODIMENTS

Figure 1:
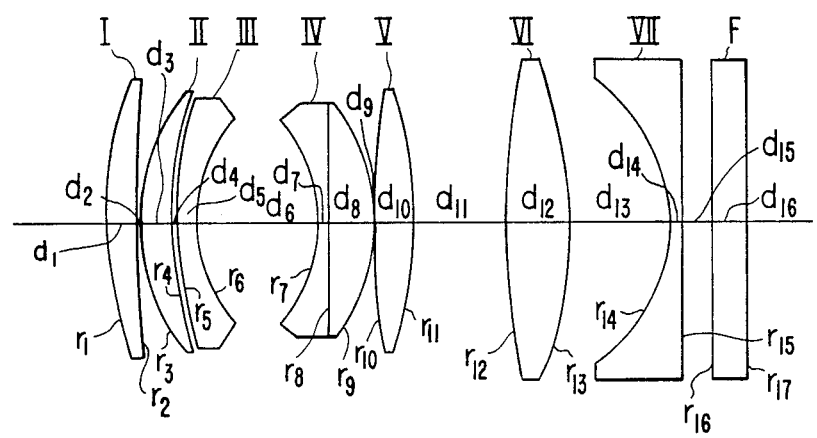
FIG. 1 is a schematic view of a projection lens according to a first embodiment of the present invention.

In the projection lens of the present invention, a positive lens unit mainly for attaining a large aperture ratio and a negative lens unit mainly for attaining a wide field angle are added at the CRT end of a Gauss type lens system which is often used as a standard lens of a single lens reflex camera, to thereby enhance the aberration correcting ability and achieve a high performance projection lens having a large aperture ratio and a wide field angle.

More specifically, a Gauss type lens system comprises first to fifth lens units I–V successively from the screen end. The first lens unit is a positive lens; the second lens unit is a positive meniscus lens having a convex surface facing the screen end; the third lens unit is a negative meniscus lens having a convex surface facing the screen end; the fourth lens unit is a negative meniscus lens having a strongly concave surface facing the screen end and having a cemented surface; and the fifth lens unit is a positive lens. Added thereto are a sixth lens unit VI mainly for attaining a large aperture ratio, the sixth lens unit being a positive lens, and a seventh lens unit VII mainly for attaining a wide field angle, the seventh lens unit being a negative lens. In this connection, the lens characteristics can be further improved by setting the relation of the first to fifth lens units to the additional sixth and seventh lens units so as to satisfy the following conditions:

$$1.2f < f_{1-5} < 1.6f \quad (1)$$

$$1.4f < f_6 < 1.7f \quad (2)$$

$$0.1f < d_{11} < 0.3f \quad (3)$$

$$-1.4f < f_7 < -f \quad (4)$$

Where, f: focal length of the overall lens system $f_{1-5}$: focal length of the system (Gauss type lens system) from the first to the fifth lens units group $f_6$: focal length of the sixth lens unit $f_7$: focal length of the seventh lens unit $d_{11}$: interplane spacing between the fifth and sixth group lens units Further, since the above additional (sixth and seventh) lens units are positioned near the surface of a cathode ray tube, a large effective aperture is inevitably required, so by using plastic lenses there are attained a reduction of weight and of cost. Additionally, by making the surfaces of the plastic lenses aspherical there are attained both a solution to the problem caused by a low index of the plastic lenses and a further improvement of performance.

The above condition (1) establishes the relation of the first to fifth lens units to the overall system. Outside the lower limit value the system will become more compact, but the spherical aberration flare will increase, leading to deterioration of performance. And outside the upper limit value the system will become larger in size and the burden of aberration correction of the sixth group positive lens unit will increase, thus making it difficult to achieve a high performance.

The condition (2) defines the focal length of the sixth group lens unit. Outside this condition the power distribution balance with the first to fifth lens units will be lost, so in that a good aberration correction can no longer be expected. More particularly, outside the lower limit the spacing between the first to fifth lens units and the sixth lens unit will become larger to the extent that the correction of off-axis aberration is difficult, and outside the upper limit the power of the first to fifth lens units will become stronger and so it becomes difficult to remove flare. The lower limit of the condition (2) also serves to maintain a focus point shift caused by a temperature variation which occurs when a plastic lens is used as the sixth lens unit, within a range free of any obstacle in practical use.

The condition (3) establishes the positional relation between the first to fifth group lens units and the sixth lens unit. Outside the lower limit the correction of the aperture dependent aberration will become unsatisfactory, and a value exceeding the upper limit will result in a reduced brightness of the edge of the image field and deterioration of off-axis aberration, although it is good for the correction of the aperture dependent aberration.

A good correction of the aperture dependent aberration has the advantage of increasing the Petzval sum, and in the construction of the first to sixth lens units it is difficult to make the Petzval sum small, so it is desirable to add a field flattener.

The condition (4) concerns the focal length of the seventh lens unit which performs the function of the field flattener and contributes a widening of the field angle.

With the projection lens of the present invention, in order to utilize its high imaging performance effectively, it is necessary to minimize stray light created by a surface reflection at the constituent lenses or the face plate of the cathode-ray tube, and thereby prevent the deterioration of contrast. The surface reflection of the lenses is improved by the provision of an anti-reflection coating and that of the face plate of the cathode-ray tube is improved by filling the space between the seventh lens unit and the CRT face plate F with a medium (e.g. an aqueous ethylene glycol solution or silicon gel) having a refractive index close to the refractive indices of the seventh lens unit and the CRT face plate. Therefore, it is desirable that the surface of the CRT face plate which is toward seventh lens unit be close to flat. The condition (4) is also a condition for the radius of curvature of the concave surface of the seventh lens unit. Outside the lower limit it will be impossible to obtain the effect of decreasing the Petzval sum to a satisfactory extent, and a value exceeding the upper limit is not desirable for off-axis aberration because the radius of curvature of the concave surface will become smaller.

Concrete embodiments of the present invention will be described hereinunder.

Figure 2:
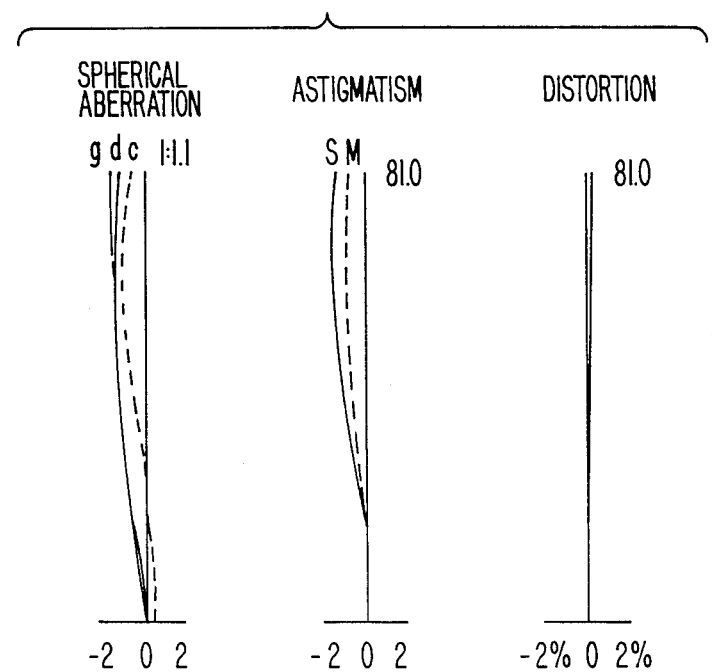
FIGS. 2(a), 2(b) and 2(c) are characteristic diagrams of spherical aberration, astigmatism and distortion, respectively, of the first embodiment of the projection lens.
Figure 3:
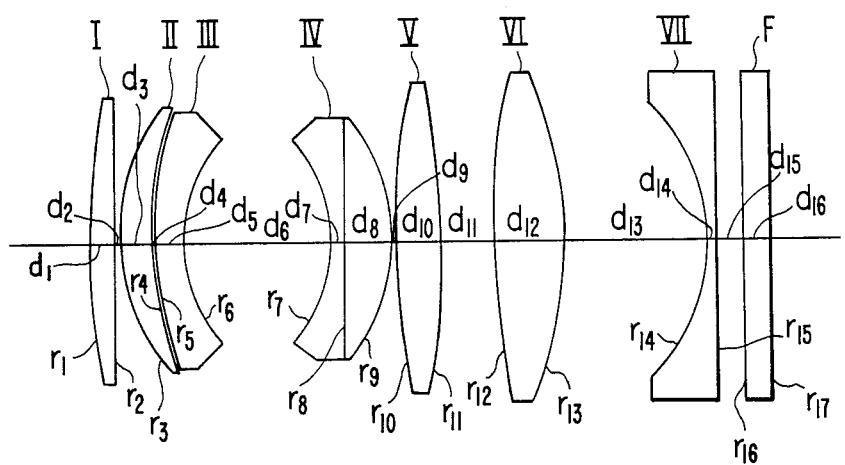
FIG. 3 is a schematic view of a projection lens according to a second embodiment of the present invention.
Figure 4:
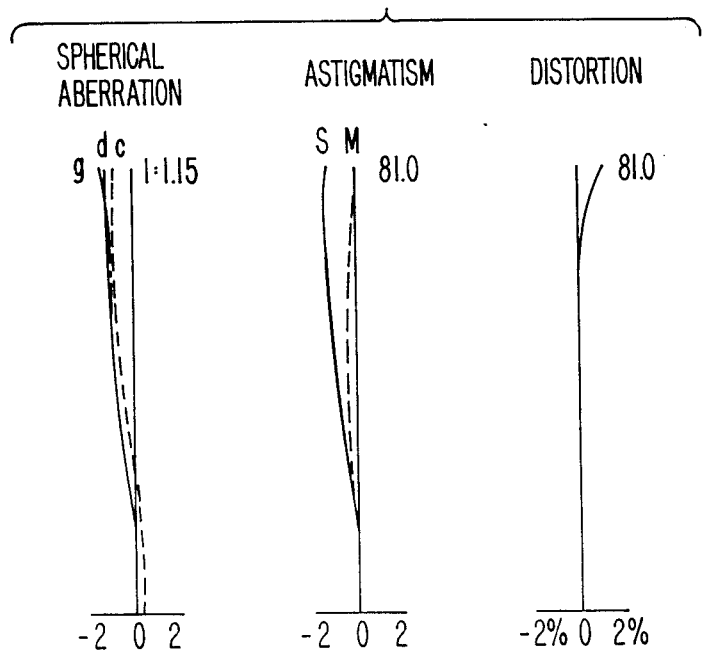
FIGS. 4(a), 4(b) and 4(c) are characteristic diagrams of spherical aberration, astigmatism and distortion, respectively, of the second embodiment of the projection lens.

FIGS. 1 and 3 illustrate arrangements of projection lenses according to first and second embodiments, respectively, of the present invention, and FIGS. 2 and 4 are aberration diagrams of the first and second embodiments, respectively. In the drawings, the reference characters $r_1, r_2, r_3, \ldots$ represent radii of curvature of the lens surfaces successively from the screen end; the characters $d_1, d_2, d_3, \ldots$ represent thicknesses and spacings of the constituent lenses; $n_1, n_2, n_3, \ldots$ represent refractive indices at line d of the lenses; $\nu_1, \nu_2, \nu_3, \ldots$ represent Abbe's numbers at line d; f represents the focal length of the overall system; $f_{1-5}$ represents the focal length of the system from the first lens unit to the fifth group lens unit; $f_6$ represents the focal length of the sixth lens unit; and $f_7$ represents the focal length of the seventh lens unit. The * marked surfaces represent aspherical surfaces which are in the shape of a revolution-symmetric aspherical surface represented by the following equation in a rectangular coordinate system which the X axis extends in the direction of an optical axis, provided r is a vertex radius of curvature, k is a conical constant, and AD, AE, AF and AG are aspherical coefficients:

$$X = \frac{\frac{\rho^2}{r}}{1 + \sqrt{1 - K\left(\frac{\rho}{r}\right)^2}} +$$

$$AD \cdot \rho^4 + AE \cdot \rho^6 + AF \cdot \rho^8 + AG \cdot \rho^{10}$$

$$\rho = \sqrt{Y^2 + Z^2}$$

Further, $n_9$ represents the refractive index of a medium filling the space between the seventh lens unit and the CRT face plate, and F represents the CRT face plate.

FIRST EMBODIMENT

-continued

|  |  |  |  |
|---|---|---|---|
| $f = 148.264$ mm | | aperture ratio 1:1.1 | |
| | magnification of projection × 10.5 | | |
| $f_{1-5} = 1.3173f$ | | $f_6 = 1.4635f$ | |
| $f_7 = -1.0979f$ | | $d_{11} = 0.2753f$ | |

| first lens unit | | | |
|---|---|---|---|
| $r_1 = 170.31$ mm | $d_1 = 14.22$ mm | $n_1 = 1.67790$ | $\nu_1 = 55.5$ |
| $r_2 = 981.29$ mm | $d_2 = 0.59$ mm | | |
| second lens unit | | | |
| $r_3 = 93.32$ mm | $d_3 = 18.53$ mm | $n_2 = 1.69350$ | $\nu_2 = 53.3$ |
| $r_4 = 259.13$ mm | $d_4 = 0.59$ mm | | |
| third lens unit | | | |
| $r_5 = 275.33$ mm | $d_5 = 3.54$ mm | $n_3 = 1.54072$ | $\nu_3 = 47.3$ |
| $r_6 = 61.51$ mm | $d_6 = 56.75$ mm | | |
| fourth lens unit | | | |
| $r_7 = -76.53$ mm | $d_7 = 3.95$ mm | $n_4 = 1.75520$ | $\nu_4 = 27.7$ |
| $r_8 = 4872.80$ mm | $d_8 = 20.46$ mm | $n_5 = 1.69350$ | $\nu_5 = 53.3$ |
| $r_9 = -98.26$ mm | $d_9 = 0.28$ mm | | |
| fifth lens unit | | | |
| $r_{10} = 291.93$ mm | $d_{10} = 18.39$ mm | $n_6 = 1.69350$ | $\nu_6 = 53.3$ |
| $r_{11} = -215.90$ mm | $d_{11} = 40.82$ mm | | |
| sixth lens unit | | | |
| $r_{12} = 264.48$ mm | $d_{12} = 30.60$ mm | $n_7 = 1.49178$ | $\nu_7 = 57.7*$ |
| $r_{13} = -172.05$ mm | $d_{13} = 44.10$ mm | | * |
| seventh lens unit | | | |
| $r_{14} = -80.05$ mm | $d_{14} = 3.95$ mm | $n_8 = 1.49178$ | $\nu_8 = 57.7*$ |
| $r_{15} = \infty$ | $d_{15} = 16.92$ mm | $n_9 = 1.45$ | |
| F | | | |
| $r_{16} = \infty$ | $d_{16} = 11.62$ mm | $n_{10} = 1.50$ | |
| $r_{17} = -2350.00$ mm | | | |

| | Aspherical coefficient | | | | |
|---|---|---|---|---|---|
| | K | AD | AE | AF | AG |
| twelfth surface: | $-1.4213$ | $-0.1833 \times 10^{-7}$ | $0.8328 \times 10^{-11}$ | $-0.6460 \times 10^{-15}$ | $0.1536 \times 10^{-18}$ |
| thirteenth surface: | $1.3146$ | $-0.3321 \times 10^{-7}$ | $0.2188 \times 10^{-11}$ | $0.1849 \times 10^{-14}$ | $-0.8994 \times 10^{-19}$ |
| fourteenth surface: | $0.6996$ | $-0.1432 \times 10^{-6}$ | $0.3929 \times 10^{-10}$ | $0.6206 \times 10^{-15}$ | $-0.2109 \times 10^{-18}$ |

SECOND EMBODIMENT

|  |  |  |  |
|---|---|---|---|
| $f = 149.128$ mm | | aperture ratio 1:1.15 | |
| | magnification of projection × 10.5 | | |
| $f_{1-5} = 1.4815f$ | | $f_6 = 1.5188f$ | |
| $f_7 = -1.2940f$ | | $d_{11} = 0.1300f$ | |

| first lens unit | | | |
|---|---|---|---|
| $r_1 = 293.62$ mm | $d_1 = 11.20$ mm | $n_1 = 1.67790$ | $\nu_1 = 55.5$ |
| $r_2 = \infty$ | $d_2 = 0.58$ mm | | |
| second lens unit | | | |
| $r_3 = 94.42$ mm | $d_3 = 15.58$ mm | $n_2 = 1.69350$ | $\nu_2 = 53.3$ |
| $r_4 = 176.36$ mm | $d_4 = 1.49$ mm | | |
| third lens unit | | | |
| $r_5 = 195.87$ mm | $d_5 = 11.73$ mm | $n_3 = 1.54072$ | $\nu_3 = 47.3$ |
| $r_6 = 62.58$ mm | $d_6 = 67.78$ mm | | |
| fourth lens unit | | | |
| $r_7 = -70.29$ mm | $d_7 = 3.89$ mm | $n_4 = 1.75520$ | $\nu_4 = 27.7$ |
| $r_8 = 5129.85$ mm | $d_8 = 20.69$ mm | $n_5 = 1.69350$ | $\nu_5 = 53.3$ |
| $r_9 = -88.89$ mm | $d_9 = 1.14$ mm | | |
| fifth lens unit | | | |
| $r_{10} = 271.21$ mm | $d_{10} = 27.21$ mm | $n_6 = 1.69350$ | $\nu_6 = 53.3$ |
| $r_{11} = -244.09$ mm | $d_{11} = 19.38$ mm | | |
| sixth lens unit | | | |
| $r_{12} = 292.07$ mm | $d_{12} = 33.23$ mm | $n_7 = 1.49178$ | $\nu_7 = 57.7*$ |
| $r_{13} = -173.30$ mm | $d_{13} = 63.57$ mm | | * |
| seventh lens unit | | | |
| $r_{14} = -94.90$ mm | $d_{14} = 3.89$ mm | $n_8 = 1.49178$ | $\nu_8 = 57.7$ |
| $r_{15} = \infty$ | $d_{15} = 17.10$ mm | $n_9 = 1.45$ | |
| F | | | |
| $r_{16} = \infty$ | $d_{16} = 11.62$ mm | $n_{10} = 1.50$ | |
| $r_{17} = -2350.00$ mm | | | |

| | Aspherical coefficient | | | | |
|---|---|---|---|---|---|
| | K | AD | AE | AF | AG |
| twelfth surface: | $-0.2401$ | $-0.1110 \times 10^{-7}$ | $0.1044 \times 10^{-10}$ | $-0.2219 \times 10^{-15}$ | $0.4493 \times 10^{-19}$ |
| thirteenth surface: | $-0.6534$ | $0.4773 \times 10^{-8}$ | $0.8093 \times 10^{-11}$ | $0.9191 \times 10^{-15}$ | $-0.8274 \times 10^{-19}$ |

What is claimed is:

1. A projection lens for producing on a screen an enlargement of an image appearing on a cathode-ray tube (CRT), comprising: successively from the screen end, a Gauss type lens system, a positive lens unit contributing mainly to enlarging the aperture ratio and comprising at least one lens; and a negative lens unit contributing mainly to widening the field angle and having a strongly concave surface which faces the screen end, said projection lens satisfying the following conditions:

$$1.2f < f_{1-5} < 1.6f \quad (1)$$

$$1.4f < f_6 < 1.7f \quad (2)$$

$$0.1f < d_{11} < 0.3f \quad (3)$$

$$-1.4f < f_7 < -f \quad (4)$$

where, f: focal length of the overall system
$f_{1-5}$: focal length of the Gauss type lens system
$f_6$: focal length of the positive lens unit contributing mainly to enlarging the aperture ratio
$f_7$: focal length of the negative lens unit contributing mainly to widening the field angle
$d_{11}$: interplane spacing between the Gauss type lens system and the positive lens unit contributing mainly to enlarging the aperture ratio.

2. The projection lens according to claim 1, having substantially the following characteristics:

lenses; $\nu_1, \nu_2, \nu_3, \ldots$ represent Abbe's numbers at line d; f represents the focal length of the overall system; $f_{1-5}$ represents the focal length of the Gauss type lens system comprising the first to fifth lens units; $f_6$ represents the focal length of the sixth lens unit; and $f_7$ represents the focal length of the seventh lens unit; the * marked surfaces represent aspherical surfaces which are in the shape of a revolution-symmetric aspherical surface represented by the following equation in a rectangular coordinate system with the X axis extending in the direction of the optical axis, provided r is a vertex radius of curvature, k is a conical constant, and AD, AE, AF and AG are aspherical coefficients:

$$X = \frac{\frac{\rho^2}{r}}{1 + \sqrt{1 - K\left(\frac{\rho}{r}\right)^2}} +$$

$$AD \cdot \rho^4 + AE \cdot \rho^6 + AF \cdot \rho^8 + AG \cdot \rho^{10}$$

$$\rho = \sqrt{Y^2 + Z^2}$$

$n_9$ represents the refractive index of a medium filled in the space between the seventh lens unit and the face

|  | f = 148.264 mm | aperture ratio 1:1.1 | | |
|---|---|---|---|---|
|  | magnification of projection × 10.5 | | | |
|  | $f_{1-5}$ = 1.3173f | $f_6$ = 1.4635f | | |
|  | $f_7$ = −1.0979f | $d_{11}$ = 0.2753f | | |
| first lens unit | | | | |
| $r_1$ = 170.31 mm | $d_1$ = 14.22 mm | $n_1$ = 1.67790 | $\nu_1$ = 55.5 | |
| $r_2$ = 981.29 mm | $d_2$ = 0.59 mm | | | |
| second lens unit | | | | |
| $r_3$ = 93.32 mm | $d_3$ = 18.53 mm | $n_2$ = 1.69350 | $\nu_2$ = 53.3 | |
| $r_4$ = 259.13 mm | $d_4$ = 0.59 mm | | | |
| third lens unit | | | | |
| $r_5$ = 275.33 mm | $d_5$ = 3.54 mm | $n_3$ = 1.54072 | $\nu_3$ = 47.3 | |
| $r_6$ = 61.51 mm | $d_6$ = 56.75 mm | | | |
| fourth lens unit | | | | |
| $r_7$ = −76.53 mm | $d_7$ = 3.95 mm | $n_4$ = 1.75520 | $\nu_4$ = 27.7 | |
| $r_8$ = 4872.80 mm | $d_8$ = 20.46 mm | $n_5$ = 1.69350 | $\nu_5$ = 53.3 | |
| $r_9$ = −98.26 mm | $d_9$ = 0.28 mm | | | |
| fifth lens unit | | | | |
| $r_{10}$ = 291.93 mm | $d_{10}$ = 18.39 mm | $n_6$ = 1.69350 | $\nu_6$ = 53.3 | |
| $r_{11}$ = −215.90 mm | $d_{11}$ = 40.82 mm | | | |
| sixth lens unit | | | | |
| $r_{12}$ = 264.48 mm | $d_{12}$ = 30.60 mm | $n_7$ = 1.49178 | $\nu_7$ = 57.7* | |
| $r_{13}$ = −172.05 mm | $d_{13}$ = 44.10 mm | | * | |
| seventh lens unit | | | | |
| $r_{14}$ = −80.05 mm | $d_{14}$ = 3.95 mm | $n_8$ = 1.49178 | $\nu_8$ = 57.7* | |
| $r_{15}$ = ∞ | $d_{15}$ = 16.92 mm | $n_9$ = 1.45 | | |
| F | | | | |
| $r_{16}$ = ∞ | $d_{16}$ = 11.62 mm | $n_{10}$ = 1.50 | | |
| $r_{17}$ = −2350.00 mm | | | | |

| | Aspherical coefficient | | | | |
|---|---|---|---|---|---|
| | K | AD | AE | AF | AG |
| twelfth surface: | −1.4213 | −0.1833 × 10⁻⁷ | 0.8328 × 10⁻¹¹ | −0.6460 × 10⁻¹⁵ | 0.1536 × 10⁻¹⁸ |
| thirteenth surface: | 1.3146 | −0.3321 × 10⁻⁷ | 0.2188 × 10⁻¹¹ | 0.1849 × 10⁻¹⁴ | −0.8994 × 10⁻¹⁹ |
| fourteenth surface: | 0.6996 | −0.1432 × 10⁻⁶ | 0.3929 × 10⁻¹⁰ | 0.6206 × 10⁻¹⁵ | −0.2109 × 10⁻¹⁸ | where $r_1, r_2, r_3, \ldots$ represent radii of curvature of the lens surfaces successively from the screen end; $d_1, d_2, d_3, \ldots$ represent thicknesses and spacings of the lenses; $n_1, n_2, n_3, \ldots$ represent refractive indices at line d of the plate of the cathode-ray tube; and F represents the face plate of the cathode-ray tube.

3. The projection lens according to claim 1, having substantially the following characteristics:

|  | f = 149.128 mm | | aperture ratio 1:1.15 | |
|---|---|---|---|---|
|  |  | magnification of projection × 10.5 | | |
|  | $f_{1-5} = 1.4815f$ | | $f_6 = 1.5188f$ | |
|  | $f_7 = -1.2940f$ | | $d_{11} = 0.1300f$ | |
| first lens unit | | | | |
| $r_1 = 293.62$ mm | $d_1 = 11.20$ mm | $n_1 = 1.67790$ | $\nu_1 = 55.5$ | |
| $r_2 = \infty$ | $d_2 = 0.58$ mm | | | |
| second lens unit | | | | |
| $r_3 = 94.42$ mm | $d_3 = 15.58$ mm | $n_2 = 1.69350$ | $\nu_2 = 53.3$ | |
| $r_4 = 176.36$ mm | $d_4 = 1.49$ mm | | | |
| third lens unit | | | | |
| $r_5 = 195.87$ mm | $d_5 = 11.73$ mm | $n_3 = 1.54072$ | $\nu_3 = 47.3$ | |
| $r_6 = 62.58$ mm | $d_6 = 67.78$ mm | | | |
| fourth lens unit | | | | |
| $r_7 = -70.29$ mm | $d_7 = 3.89$ mm | $n_4 = 1.75520$ | $\nu_4 = 27.7$ | |
| $r_8 = 5129.85$ mm | $d_8 = 20.69$ mm | $n_5 = 1.69350$ | $\nu_5 = 53.3$ | |
| $r_9 = -88.89$ mm | $d_9 = 1.14$ mm | | | |
| fifth lens unit | | | | |
| $r_{10} = 271.21$ mm | $d_{10} = 27.21$ mm | $n_6 = 1.69350$ | $\nu_6 = 53.3$ | |
| $r_{11} = -244.09$ mm | $d_{11} = 19.38$ mm | | | |
| sixth lens unit | | | | |
| $r_{12} = 292.07$ mm | $d_{12} = 33.23$ mm | $n_7 = 1.49178$ | $\nu_7 = 57.7*$ | |
| $r_{13} = -173.30$ mm | $d_{13} = 63.57$ mm | | * | |
| seventh lens unit | | | | |
| $r_{14} = -94.90$ mm | $d_{14} = 3.89$ mm | $n_8 = 1.49178$ | $\nu_8 = 57.7$ | |
| $r_{15} = \infty$ | $d_{15} = 17.10$ mm | $n_9 = 1.45$ | | |
| F | | | | |
| $r_{16} = \infty$ | $d_{16} = 11.62$ mm | $n_{10} = 1.50$ | | |
| $r_{17} = -2350.00$ mm | | | | |

| | Aspherical coefficient | | | | |
|---|---|---|---|---|---|
| | K | AD | AE | AF | AG |
| twelfth surface: | −0.2401 | $-0.1110 \times 10^{-7}$ | $0.1044 \times 10^{-10}$ | $-0.2219 \times 10^{-15}$ | $0.4493 \times 10^{-19}$ |
| thirteenth surface: | −0.6534 | $0.4773 \times 10^{-8}$ | $0.8093 \times 10^{-11}$ | $0.9191 \times 10^{-15}$ | $-0.8274 \times 10^{-19}$ | where $r_1, r_2, r_3, \ldots$ represent radii of curvature of the lens surfaces successively from the screen end; $d_1, d_2, d_3, \ldots$ represent thickness and spacings of the lenses; $n_1, n_2, n_3, \ldots$ represent refractive indices at line d of the lenses; $\nu_1, \nu_2, \nu_3, \ldots$ represent Abbe's numbers at line d; f represents the focal length of the overall system; $f_{1-5}$ represents the focal length of the Gauss type lens system comprising the first to fifth lens units; $f_6$ represents the focal length of the sixth lens unit; $f_7$ represents the focal length of the seventh lens unit; the * marked surfaces represent aspherical surfaces which are in the shape of a revolution-symmetric aspherical surface represented by the following equation in a rectangular coordinate system with the X axis extending in the direction of the optical axis, provided r is a vertex radius of curvature, k is a conical constant, and AD, AE, AF and AG are aspherical coefficients:

$$X = \frac{\frac{\rho^2}{r}}{1 + \sqrt{1 - K\left(\frac{\rho}{r}\right)^2}} + AD \cdot \rho^4 + AE \cdot \rho^6 + AF \cdot \rho^8 + AG \cdot \rho^{10}$$

$$\rho = \sqrt{Y^2 + Z^2}$$

$n_9$ represents the refractive index of a medium filled in the space between the seventh lens unit and the face plate of the cathode-ray tube; and F represents the face plate of the cathode-ray tube.

4. A projection lens for producing on a screen an enlargement of an image appearing on a cathode-ray tube (CRT), comprising: successively from the screen end, a first lens unit which is a positive lens; a second lens unit which is a positive meniscus lens having a convex surface facing the screen end; a third lens unit which is a negative meniscus lens having a convex surface facing the screen end; a fourth lens unit which is a negative meniscus lens having a strongly concave surface facing the screen end and having a cemented surface; fifth and sixth lens units which are both positive lenses; and a seventh lens unit which is a negative lens having a strongly concave surface facing the screen end, said projection lens satisfying the following four conditions:

$1.2f < f_{1-5} < 1.6f$     (1)

$1.4f < f_6 < 1.7f$     (2)

$0.1f < d_{11} < 0.3f$     (3)

$-1.4f < f_7 < -f$     (4)

where,
f: focal length of the overall system
$f_{1-5}$: focal length of the system from the first to fifth lens units
$f_6$: focal length of the sixth lens unit
$f_7$: focal length of the seventh lens unit
$d_{11}$: interplane spacing between the fifth and sixth lens units.

* * * * *